T. L. LEE.
ELECTRIC SYSTEM FOR MOTOR VEHICLES.
APPLICATION FILED NOV. 4, 1919.
1,406,039. Patented Feb. 7, 1922.
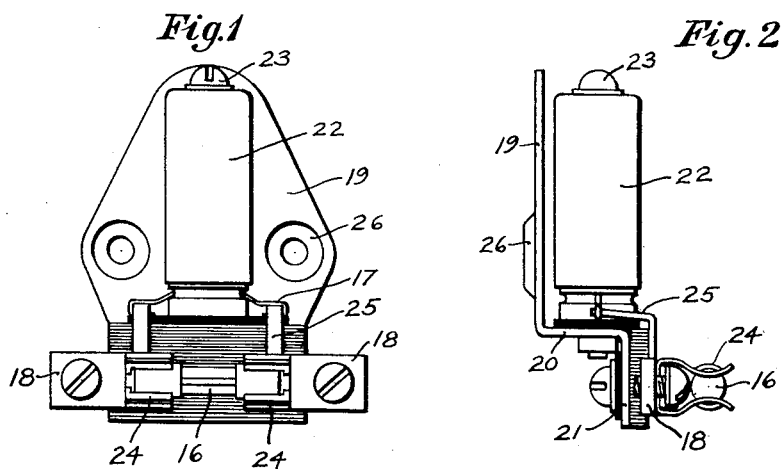
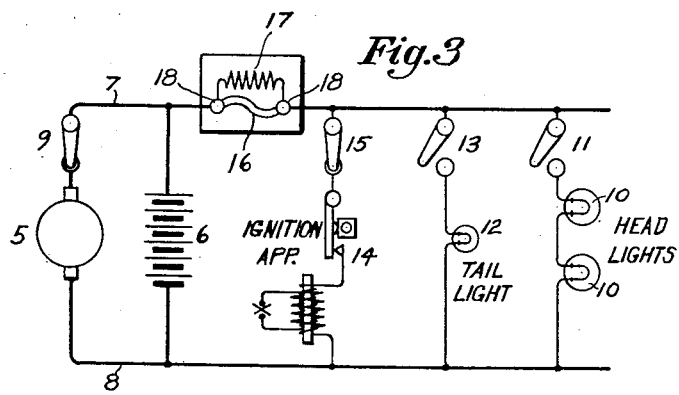
INVENTOR
Thomas L. Lee
BY
Farnum F. Dorsey
HIS ATTORNEY

UNITED STATES PATENT OFFICE.

THOMAS L. LEE, OF ROCHESTER, NEW YORK, ASSIGNOR TO NORTH EAST ELECTRIC COMPANY, OF ROCHESTER, NEW YORK, A CORPORATION OF NEW YORK.

ELECTRIC SYSTEM FOR MOTOR VEHICLES.

1,406,039.    Specification of Letters Patent.    Patented Feb. 7, 1922.

Application filed November 4, 1919. Serial No. 335,689.

*To all whom it may concern:*

Be it known that I, THOMAS L. LEE, a citizen of the United States, residing at Rochester, in the county of Monroe and State of New York, have invented certain new and useful Improvements in Electric Systems for Motor Vehicles; and I do hereby declare the following to be a full, clear, and exact description of the invention, such as will enable others skilled in the art to which it appertains to make and use the same.

It is common to provide an automobile, or other motor-vehicle, with an electric system in which a source of current, such as a storage-battery, supplies the energy for operating electric lights, ignition-apparatus, and other translating-devices.

In such a system a short-circuit is liable to occur, through carelessness on the part of the user or through defects in the insulation of the system, with serious consequences to the circuit-conductors or the source of current.

A common way to safeguard an electric system against short-circuits is to interpose a fuse in a main conductor of the system. But a fuse, used in the ordinary manner, is undesirable in the electric system of a motor-vehicle for two reasons. In the first place, the user of the vehicle is likely to fail to provide spare fuses, with the result that when the fuse has blown, in consequence of a short-circuit, he is unable to restore the system to operation, even though the cause of the short-circuit has been removed or was merely temporary in its nature. In the second place, the cause of the short-circuit may be intermittent, but so obscurely located as not to be readily detected and removed.

The object of the present invention is to provide an electric system, of the kind in question, with a simple and reliable device which will safe-guard it against the destructive effects of a short-circuit, but which will permit continued operation of the system, without the necessity of renewing a fuse, or any other attention on the part of the user, whenever the cause of the short-circuit has been removed or is merely temporary or intermittent.

To the foregoing end it is proposed to interpose, in a main conductor of the system, a fuse adapted to blow upon the occurrence of a short-circuit, but to connect in parallel with the fuse a resistance-device so adjusted as to permit a flow of current sufficient for the continued operation of some or all the translating-devices of the system, but not sufficient to unduly load or discharge the battery or other source of current.

In the accompanying drawings Fig. 1 is a front-elevation, and Fig. 2 a side-elevation, of a protective device comprising a combined fuse and resistance-unit adapted for use in carrying out the present invention, and Fig. 3 is a diagram of an electric system embodying the invention.

In Fig. 3 the system is shown as comprising two sources of current, namely, a generator 5 and a storage-battery 6, which are connected in parallel, in the usual manner, to the two main conductors 7 and 8 of the system. A switch 9, interposed in the conductor 7, may be used to disconnect the generator when it is not in operation.

In the illustrated system the translating devices include a pair of head-lights 10 controlled by a switch 11, a tail-light 12 controlled by a switch 13, and electric ignition-apparatus 14, of conventional form, controlled by a switch 15.

The protective device characteristic of the invention comprises a fuse 16 and a resistance-device 17, which are connected, in parallel, to two common terminals 18 and interposed in the main conductor 7 between the translating devices and the sources of current. This arrangement is such that if the fuse be blown the resistance-device will still conduct a certain amount of current to the translating devices.

The capacity of the fuse and the resistance of the resistance-device are adjusted according to the characteristics of the other parts of the system, the capacity of the fuse being substantially above the normal maximum load imposed by the translating devices, but substantially below the amount necessary to dangerously overload the source of current or the conductors of the system. The resistance-device has conductivity sufficient to pass a current which will permit continued operation of the translating devices, or at least of the more essential ones, but sufficient resistance to prevent dangerous overloading in the case of a continued short-circuit. Where the source of current is a battery the resistance is preferably such as to limit the discharge, through a continued short-circuit, to an amount which will not deplete the battery during a period of several hours, thus affording time for the discovery and removal of the cause of the short-circuit before the system is rendered inoperative by reason of the exhaustion of the current-supply.

As a specific instance of a system successfully embodying the invention, the system shown in Fig. 3 may be provided with a six-cell storage-battery, maintaining a minimum of approximately 12 volts across the main conductors 7 and 8 when the system is in operation. The head-lights may be of 15 c. p. each, the resistance of the two lamps in series being about 6 ohms. The tail-lamp may be of 4 c. p., with a resistance of 36 ohms, while the resistance of the primary circuit of the ignition-apparatus, apart from the reactance of the coil or transformer, may be about 6 ohms. The resistance of the connecting wires may be so low as to be negligible.

In a system as just described the fuse 16 may be of 10 amperes nominal capacity, and the resistance-device 17 may have a resistance of about 3 ohms. It should also be capable of dissipating indefinitely the heat resulting from a continuous current of 5 amperes, since the generator, when operating, may produce an E. M. F. of about 15 volts across the main conductors.

With a resistance of 3 ohms in the resistance-device the maximum rate of discharge of the battery 6 on short-circuit, after the fuse 16 has blown, is limited to about 4 amperes, and the battery, if of the size and type ordinarily used in systems of the kind in question, will sustain this discharge for several hours unless already in a discharged condition when the short-circuit occurs. If the short-circuit is removed or is merely intermittent in character, the translating devices will continue to operate by the current flowing through the resistance-device. The ignition apparatus will operate without appreciable impairment of its efficiency, for at high speeds the virtual resistance of the apparatus, due chiefly to impedance, is so high that the 3 ohms of the resistance-device constitute only a small proportionate increase.

The tail-light will also operate with very little diminution of its brilliancy, since its resistance of 36 ohms is large in proportion to that of the resistance-device.

The head-lights will be substantially dimmed by the additional resistance of 3 ohms, but will still glow sufficiently to conform with legal requirements and permit the operation of the vehicle at night.

A simple, compact and convenient structure, by which the fuse and the resistance-device are interconnected and are embodied in a self-contained unit or instrument, is shown in Figs. 1 and 2. This structure has a base-member consisting of a single piece of sheet-metal and comprising a back-plate 19, a shelf 20 projecting horizontally from the lower end of the back-plate, and a flange 21 depending from the outer edge of the shelf. The resistance-unit 22 is mounted on the shelf 20 and secured in place by a through-bolt 23. The fuse 16 is held in clips 24 which are bolted to, but insulated from the front of the flange 21. The terminal-lugs 18 are directly engaged by the fuse-clips, and are provided with arms 25 to which the ends of the resistance-wire 17 are soldered, thus connecting the resistance-device in parallel with the fuse through the terminal-lugs.

The back-plate has perforated depressed portions 26 which receive screws to secure the instrument in place against a surface such as the dash of a vehicle, and by means of these depressed portions the body of the back-plate is held clear of the support so as to afford free access of the air to dissipate heat conducted to the back-plate from the resistance-unit.

It will be apparent that the described specific construction of the resistance-unit and the fuse are not essential to embodiment of the invention in its broader aspects, also that the resistance and the current-carrying capacity of these parts will necessarily be varied according to the characteristics of the system in which the invention is used. The invention is, therefore, not limited to the embodiment thereof hereinbefore described, but it may be embodied in various other forms within the scope of the following claims.

The invention claimed is:

1. In an electric system for motor-vehicles, the combination, with a storage-battery, electric lights and ignition-apparatus, and a conductor connecting the storage-battery with the lights and the ignition-apparatus, of a fuse interposed in the conductor and adapted to blow in case of a dead short-circuit through the conductor; and a resistance-device connected in parallel with the fuse and having a conductivity substantially equal to the combined conductivities of the lights and the ignition-apparatus.

2. In an electric system for motor-vehicles, the combination, with a source of current, electric head-lights, an electric tail-light, and a conductor connecting the source of current with the lights, of a fuse interposed in the conductor; and a resistance-device connected in parallel with the fuse and having a resistance equal to approximately half the resistance of the head-lights.

3. In an electric system for motor-vehicles, the combination of a source of current; electric head-lights; electric ignition-apparatus; a common conductor connecting the source of current with the head-lights and the ignition-apparatus; a fuse interposed in the conductor; and a resistance-device connected in parallel with the fuse; the resistance of the resistance-device being approximately half that of the head-lights and of the ignition-apparatus.

4. In an electric system for motor-vehicles, the combination, with a storage-battery, electric lights, electric ignition-apparatus, and a common conductor connecting the battery with the electric lights and the ignition-apparatus, of a fuse interposed in said main-conductor, and a resistance-device connected in parallel with the fuse.

5. In an electric system for a motor-vehicle, the combination, with a source of current, translating-devices, and conductive connections between the translating-devices and the source of current, of a fuse interposed in said connections; and a resistance-device, connected in parallel with the fuse, having resistance high enough to protect the source of current against excessive discharge but not to prevent the operation of the translating-devices when the fuse is blown.

6. An electric system as in claim 5, in which the resistance of the resistance-device, in ohms, is approximately three-tenths of the conductivity, in amperes, of the fuse.

THOMAS L. LEE.